(12) United States Patent
Nozaki

(10) Patent No.: US 6,475,551 B2
(45) Date of Patent: *Nov. 5, 2002

(54) PROCESS FOR PREPARING FOAMED MEAT PROCESSED FOODS

(75) Inventor: Hisashi Nozaki, Saitama (JP)

(73) Assignee: Kabushiki Kaisha Kibun Shokuhin (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/051,715

(22) PCT Filed: Oct. 18, 1995

(86) PCT No.: PCT/JP95/02131

§ 371 (c)(1),
(2), (4) Date: Sep. 2, 1998

(87) PCT Pub. No.: WO97/14320

PCT Pub. Date: Apr. 24, 1997

(65) Prior Publication Data

US 2002/0001664 A1 Jan. 3, 2002

(51) Int. Cl.⁷ ............................................. A23L 1/317
(52) U.S. Cl. ..................... 426/646; 426/513; 426/519
(58) Field of Search .................................. 426/564, 641, 426/646, 519, 513

(56) References Cited

U.S. PATENT DOCUMENTS

| | | | |
|---|---|---|---|
| 3,520,701 A | * 7/1970 | Rendeu et al. | 426/646 X |
| 4,560,570 A | 12/1985 | Rausing et al. | |
| 4,702,218 A | 10/1987 | Yoshioka et al. | |
| 5,620,736 A | * 4/1997 | Reinl et al. | 426/646 X |
| 5,925,394 A | * 7/1999 | Levinson | 426/564 X |

FOREIGN PATENT DOCUMENTS

| | | |
|---|---|---|
| DE | 3446829 | 7/1986 |
| EP | 0590172 | 4/1994 |
| JP | 60-006177 | 1/1989 |
| JP | 64-002555 | 1/1989 |
| JP | 04-278062 | 10/1992 |

OTHER PUBLICATIONS

Patent Abstract of Japan, JP 01282062, Inventor—Hoashi Chikano, Title—Production of Chikuma.
Patent Abstract of Japan, JP 03201967, Inventor—Yamamoto Fusako, Title—Hanpen (Cake of Pounded Fish) and Production Thereof.
Patent Abstract of Japan, JP 02057163, Inventor—Hoashi Chikano, Title—Fish Meat Paste Product.
Patent Abstract of Japan, JP 01304867, Inventor—Obata Shizuo, Title—Preparation of Air–Containing Fish Paste Food.
Patent Abstract of Japan, JP 09098744, Inventor—Sakayori Yuji, Title—Production of Air–Containing Food.
Patent Abstract of Japan, JP 09000207, Inventor—Nakamura Toyoro, Title—Meat Product Having Air–Including Property and Its Production.
Patent Abstract of Japan, JP 07289203, Inventor—Sakurai Seiya, Title—Hanpen–Like Pastry Food of Livestock Meat.

* cited by examiner

*Primary Examiner*—Arthur L. Corbin
(74) *Attorney, Agent, or Firm*—Browdy and Neimark, P.L.L.C.

(57) ABSTRACT

Disclosure is made of a process for producing foamed processed meat foods which comprises mixing meat with sodium chloride under agitation (so-called "shio-zuri"), foaming the resultant composition by stirring and then molding and heating it, and foamed processed meat foods produced by this process. The processed meat foods of the present invention are characterized by soft and light texture.

6 Claims, No Drawings

PROCESS FOR PREPARING FOAMED MEAT PROCESSED FOODS

TECHNICAL FIELD

This invention relates to foamed processed meat foods and a process for producing the same. Because of having been foamed, the foods of the present invention are characterized by soft texture and are easy to eat.

1. Background Art

Meat matches well modern eating habits and, therefore, meat per se and processed meat products are both widely popular. Processed meat products involve various meats, for example, ham, sausage, bacon, corned beef and roasted pork. These processed products have the inherent structure and crisp texture of meat. In recent years, however some consumers have chosen softer foods and prefer processed ground meat foods to those having the characteristic texture of meat. However, there is no processed meat food with soft texture at the present time except hamburger steak and products similar thereto. Namely, although there are potential needs for soft processed meat products, there is no food satisfying this requirement in practice.

Under these circumstances, an object of the present invention is to provide novel processed meat foods having soft and light texture.

2. Disclosure of the Invention

Thus the present inventors have found that foamed processed meat foods having soft texture can be produced by mixing meat with sodium chloride under agitation (so-called "shio-zuri"), foaming the resultant composition by stirring and then molding and heating it, thus achieving the above-mentioned object.

The meat to be used in the present invention may be an arbitrary one, so long as it is selected from edible ones (beef, pork, chicken, mutton, horse, rabbit, etc.). It is also possible to use two or more meats together. As usual, use is made of one or more meats such as beef, pork or chicken. If desired, the meat may be processed into ground meat, etc. so as to facilitate the processing. The meat may be used together with other materials such as fish meat.

To produce foamed products, it is necessary that the meat is first subjected to shio-zuri to thereby solubilize proteins, thus facilitating the subsequent foaming by stirring. The shio-zuri operation may be performed by a method commonly employed in the art. In the step of shio-zuri, the concentration of sodium chloride is regulated preferably to 2 to 4% based on the meat. At such a concentration, proteins in the meat can be efficiently solubilized and an appropriate saltiness can be imparted to the final product. In addition to sodium chloride, other components may be used in this step, so long as the effects of sodium chloride are not inhibited thereby. For example, use may be made therefor of sweeteners, seasonings, etc., as will be described hereinafter. The shio-zuri can be carried out by using an apparatus usually employed therefor, for example, a food cutter, an attritor or a silent cutter.

The foaming by stirring, which is the subsequent procedure, may be conducted either batch-wise or continuously. In a batch process, use may be made therefor of an attritor, a silent cutter or a high-speed cutter. In a continuous process, it is possible to use, for example, a continuous pin mixer described in JP (Kokoku) Sho 63-63190 (FIG. 2). By using the continuous process, the product can be efficiently produced without any suspension. The foaming is carried out so that the final product has a specific gravity of from 0.3 to 0.95, preferably from 0.4 to 0.8, still preferably from 0.5 to 0.75, and from 0.5 to 0.6 in the most desirable case. When the product has a high specific gravity due to poor foaming, it has a high gel strength and relatively hard texture. Namely, an excessively high specific gravity is inappropriate for processed foods with soft texture. On the other hand, a product having a low specific gravity due to rich foaming shows a low gel strength and soft texture. However, the air-content and specific gravity may be appropriately controlled depending on the desired texture and physical properties of the product.

A foaming agent may be added to the meat composition prior to the foaming by stirring. The foaming agent can elevate the viscosity of the composition and thus allow to maintain air bubbles incorporated therein as such during stirring. It may be selected from various foaming agents which are suitable for edible use and exert no undesirable effect on other steps of the present invention. Examples of the foaming agent usable in the present invention include yam, egg albumen, thickening polysaccharides (guar gum, etc.) and emulsifiers. Any one of these foaming agents or a mixture thereof may be employed. The amount of the foaming agent varies depending on the air content. That is to say, the amount of the foaming agent employed is increased with an increase in the foam volume. To the foamed composition, side materials (seasonings, sweeteners, starch, bread crumbs, etc.) may be added. Furthermore, solid matters such as vegetable and meat pieces may be added to the foamed composition.

The molding is performed by a method commonly employed in the art with the use of a molding machine, etc. For example, the foamed composition is shaped into balls, ovals, etc. depending on the desired final product. The heating is also carried out in a conventional manner, for example, frying, steaming, boiling or roasting. These procedures maybe appropriately combined with each other depending on the desired final product.

The production process as described above may further involve additional steps. For example, additives (sweeteners, seasonings, starch, bread crumbs, vegetables, etc.) may be added at an appropriate step. Moreover, ground meat or meat blocks may be added to the foamed composition. The types and amounts of these additives may be appropriately selected within the scope known by those skilled in the art, so long as the specific gravity of the final product falls within the range of from 0.3 to 0.95. The addition timing is not particularly restricted too. In particular, sweeteners, seasonings, etc. may be added either before or after the foaming by stirring. The production process of the present invention may involve additional procedures.

To further illustrate the present invention in greater detail, the following Examples will be given.

EXAMPLE 1

35 g of sodium chloride was added to 1 kg of ground lean beef which was then subjected to shio-zuri by using a silent cutter (manufactured by Bibun). When the mixture became viscous, 10 g of guar gum and 100 g of egg albumen were added thereto and the resultant composition was foamed by stirring with a silent cutter (manufactured by Bibun). When the specific gravity of the composition reached about 0.70, 50 g of potato starch, 20 g of sodium glutamate, 5 g of pepper and 500 ml of water were added thereto followed by thorough mixing. The composition showed a specific gravity of 0.80 at this stage. Next, the composition was molded into a circular form (diameter: 8 cm, thickness: 1 cm) and heated in hot water at 85 to 95° C. for 15 minutes to thereby give a foamed processed beef product.

This processed beef product had a soft texture never observed in the conventional products. It tasted soft and good when fried in butter or sandwiched.

EXAMPLE 2

40 g of sodium chloride was added to 1 kg of ground chicken breast which was then subjected to shio-zuri by using a silent cutter (manufactured by Bibun). When the mixture became viscous, 50 g of yam, 10 g of guar gum and 100 g of egg albumen were added thereto and the resultant composition was foamed by stirring with a silent cutter (manufactured by Bibun). When the composition was sufficiently foamed, 70 g of potato starch, 30 g of sucrose, 20 g of sodium glutamate, 50 g of chicken extract, 5 g of pepper and 350 g of water were added thereto followed by thorough mixing. The composition showed a specific gravity of 0.5 at this stage. Next, 400 g of ground chicken and 200 g of small onion pieces were added to the foamed composition. The resultant composition showed a specific gravity of 0.75. Then the composition was molded into an oval form (10 cm×7 cm, thickness: 12 mm) and steamed in a steamer at 85 to 95° C. for 15 minutes to thereby give a foamed processed chicken product.

This processed chicken product had a soft and light texture while sustaining the grained touch characteristic to ground meat.

EXAMPLE 3

100 g of sodium chloride was added to 5 kg of ground pork inside ham which was then subjected to shio-zuri by using a silent cutter (manufactured by Bibun). After the completion of the shio-zuri, 150 g of egg albumen, 250 g of potato starch, 20 g of sucrose, 20 g of sodium glutamate, 20 g of sake, 20 g of soy sauce, 7 g of pepper and 1 liter of water were added thereto followed by thorough mixing. The composition was foamed with the use of a pin mixer described in JP (Kokoku) Sho 63-63190 so that it showed a specific gravity of 0.85. The composition was molded into an oval form (10 cm×7 cm, thickness: 10 mm) and fried in oil at 160 to 170° C. for 10 seconds so as to cause gelation at the surface Subsequently, it was steamed in a steamer at 85 to 95° C. for 15 minutes to thereby completely heat to the core, thus giving a foamed processed pork product.

This processed pork product had a soft texture.

What is claimed is:

1. A process for producing a soft foamed process meat food comprising:
   a. mixing meat with sodium chloride under agitation (so-called "shio-zuri");
   b. foaming the resultant composition by stirring to provide a foamed composition; and
   c. then molding and heating the foamed composition, wherein water is added between the foaming by stirring and the subsequent molding; and
   d. wherein the soft foamed processed meat food so produced has a specific gravity of 0.3 to 0.95.

2. The process according to claim 1 wherein the meat is a ground meat.

3. The process according to claim 1 wherein the concentration of sodium chloride is 2 to 4%, based on the meat in the step of shio-zuri.

4. The process according to claim 1 wherein the heating is carried out by steaming.

5. The process according to claim 1 wherein the heating is carried out by boiling.

6. The process according to claim 1 wherein water is added in an amount of at least 1 part by weight per 5 parts by weight of the mixed meat between the foaming by stirring and subsequent molding.

* * * * *